United States Patent
Logli, Jr. et al.

(10) Patent No.: US 9,937,900 B2
(45) Date of Patent: Apr. 10, 2018

(54) ON-BOARD VEHICLE VACUUM CLEANER SYSTEM

(71) Applicants: Larry J Logli, Jr., Macomb, MI (US); Gagan K Mann, Bloomfield Hills, MI (US); Bryan G Horvat, Shelby Township, MI (US)

(72) Inventors: Larry J Logli, Jr., Macomb, MI (US); Gagan K Mann, Bloomfield Hills, MI (US); Bryan G Horvat, Shelby Township, MI (US)

(73) Assignee: FCA US LLC, Auburn Hills, MI (US)

(*) Notice: Subject to any disclaimer, the term of this patent is extended or adjusted under 35 U.S.C. 154(b) by 272 days.

(21) Appl. No.: 14/745,604

(22) Filed: Jun. 22, 2015

(65) Prior Publication Data

US 2016/0368461 A1    Dec. 22, 2016

(51) Int. Cl.
*B60S 1/64* (2006.01)
*A47L 9/12* (2006.01)
*A47L 7/00* (2006.01)

(52) U.S. Cl.
CPC .................................. *B60S 1/64* (2013.01)

(58) Field of Classification Search
CPC ............. B60S 1/64; A47L 7/0076; A47L 9/12
USPC ......................................................... 15/313
See application file for complete search history.

(56) References Cited

U.S. PATENT DOCUMENTS

| | | | | |
|---|---|---|---|---|
| 2,218,265 A * | 10/1940 | Nathan | .................... | B60H 1/00 123/142.5 R |
| 3,384,916 A | 5/1968 | Hockin | | |
| 3,449,787 A * | 6/1969 | Rothstein | .................. | B60S 1/64 15/313 |
| 5,316,255 A * | 5/1994 | Marcusen | ............ | B60N 2/4686 248/309.3 |
| 5,829,091 A * | 11/1998 | Ingram | ..................... | B60S 1/64 15/313 |
| 6,148,472 A * | 11/2000 | Arena | ..................... | A47L 9/108 15/313 |
| 6,490,751 B2 * | 12/2002 | Ganzenmuller | .......... | B60S 1/64 15/313 |
| 6,735,810 B2 | 5/2004 | Najm et al. | | |
| 7,152,272 B2 * | 12/2006 | Rukavina | .............. | A47L 7/0076 15/313 |
| 7,231,686 B1 | 6/2007 | Matheney | | |
| 7,266,859 B2 * | 9/2007 | Slone | ........................ | B60S 1/64 15/313 |
| 7,513,007 B2 * | 4/2009 | Chernoff | ................... | A47L 5/24 15/313 |
| 8,296,897 B2 | 10/2012 | Moore | | |

(Continued)

*Primary Examiner* — Marc Carlson
(74) *Attorney, Agent, or Firm* — Ralph E. Smith

(57) ABSTRACT

An on-board central vacuum system includes a vacuum motor assembly, a first vacuum port assembly and a connecting hose. The first vacuum port assembly is configured in a first location of the vehicle. The first vacuum port assembly includes a recess formed in vehicle trim and a cup holder. The recess defines a first port. The cup holder is removably positioned in the recess. The cup holder is movable between and installed position and a removed position. In the installed position the cup holder is received by the recess and blocks access to the first port. In the removed position, the cup holder is removed from the recess revealing access to the first port. The connecting hose fluidly connects the vacuum motor assembly to the first port.

12 Claims, 3 Drawing Sheets

(56) References Cited

U.S. PATENT DOCUMENTS

| | | | |
|---|---|---|---|
| 2004/0107528 A1* | 6/2004 | LeClear | A47L 5/38 15/313 |
| 2004/0134013 A1* | 7/2004 | Slone | B60S 1/64 15/313 |
| 2005/0011035 A1* | 1/2005 | Rukavina | A47L 7/0076 15/313 |
| 2006/0080801 A1* | 4/2006 | Nameth | A47L 5/24 15/313 |
| 2010/0005612 A1* | 1/2010 | Moore | B60S 1/64 15/313 |
| 2012/0210536 A1 | 8/2012 | Jan et al. | |

* cited by examiner

ON-BOARD VEHICLE VACUUM CLEANER SYSTEM

FIELD

The present application relates generally to vacuum cleaner systems incorporated on motor vehicles and, more particularly, to a central vacuum cleaner system having a series of ports accessible throughout the vehicle.

BACKGROUND

Vacuum cleaner systems have been provided on automotive motor vehicles to offer a convenient way to clean the interior of the vehicle. Such systems have included the vacuum motor assembly on-board the vehicle. Vacuum systems are particularly popular in the mini-van or sport utility vehicle market segment where three rows of seats are offered and children are the typical rear seat occupants. With an on-board vacuum system, a user need not be required to transport or move a stand-alone vacuum to a location near or into the vehicle to vacuum the vehicle interior.

While the on-board systems available today provide convenience, they can still be difficult to operate and are generally unsightly in the vehicle. For example, manipulation of the intake hose can be difficult within the vehicle given the tight surroundings. Thus, while vacuum cleaner systems work for their intended purpose, there remains a need for improvement in the relevant art.

SUMMARY

In one aspect of the application, an on-board central vacuum system for a vehicle is provided. In an exemplary implementation, the on-board central vacuum system includes a vacuum motor assembly, a first vacuum port assembly and a connecting hose. The first vacuum port assembly is configured in a first location of the vehicle. The first vacuum port assembly includes a recess formed in vehicle trim and a cup holder. The recess defines a first port. The cup holder is removably positioned in the recess. The cup holder is movable between and installed position and a removed position. In the installed position the cup holder is received by the recess and blocks access to the first port. In the removed position, the cup holder is removed from the recess revealing access to the first port. The connecting hose fluidly connects the vacuum motor assembly to the first port.

According to other features, the recess formed in the vehicle trim includes an annular trim wall that connects an upper rim and a lower end surface. The upper rim and the end surfaces are parallel to each other. The first port defines a first entrance through the end surface. The hose assembly selectively mats with the vacuum port assembly when the cup holder is in the removed position. The vacuum port assembly further comprises a first connection portion thereon.

According to still other features, the hose assembly includes a second connection portion thereon. The first and second connection portions are configured to selectively engage. The second connection portion comprises a quick-connect having a user actuatable portion that moves between a coupled position and a de-coupled position. The user actuatable portion is biased toward the coupled position. A compliant seal is positioned between the cup holder and the first port in the installed position.

According to additional features, the on-board central vacuum system further comprises a second vacuum port assembly configured in a second location of the vehicle. The first and second locations are distinct. The first vacuum port assembly is located in vehicle trim adjacent to a second row of seats. The second vacuum port assembly is located in one of a center console and a rear cargo area of the vehicle. The vacuum motor assembly is operable in a first vacuum mode of operation where air is directed from the first vacuum port assembly toward the vacuum motor assembly and in a second blower mode of operation where air is directed from the vacuum motor assembly toward the first vacuum port assembly.

According to other features, the vacuum motor assembly includes a housing, a motor and a check valve. The motor is disposed in the housing. The check valve is disposed in the housing and is movable between a vacuum position and a blower position. In the vacuum position, air is directed toward the vacuum motor assembly. In the blower position, air is directed away from the vacuum motor assembly. The vacuum motor assembly further includes a filter disposed in the housing.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DESCRIPTION

Figure 1:
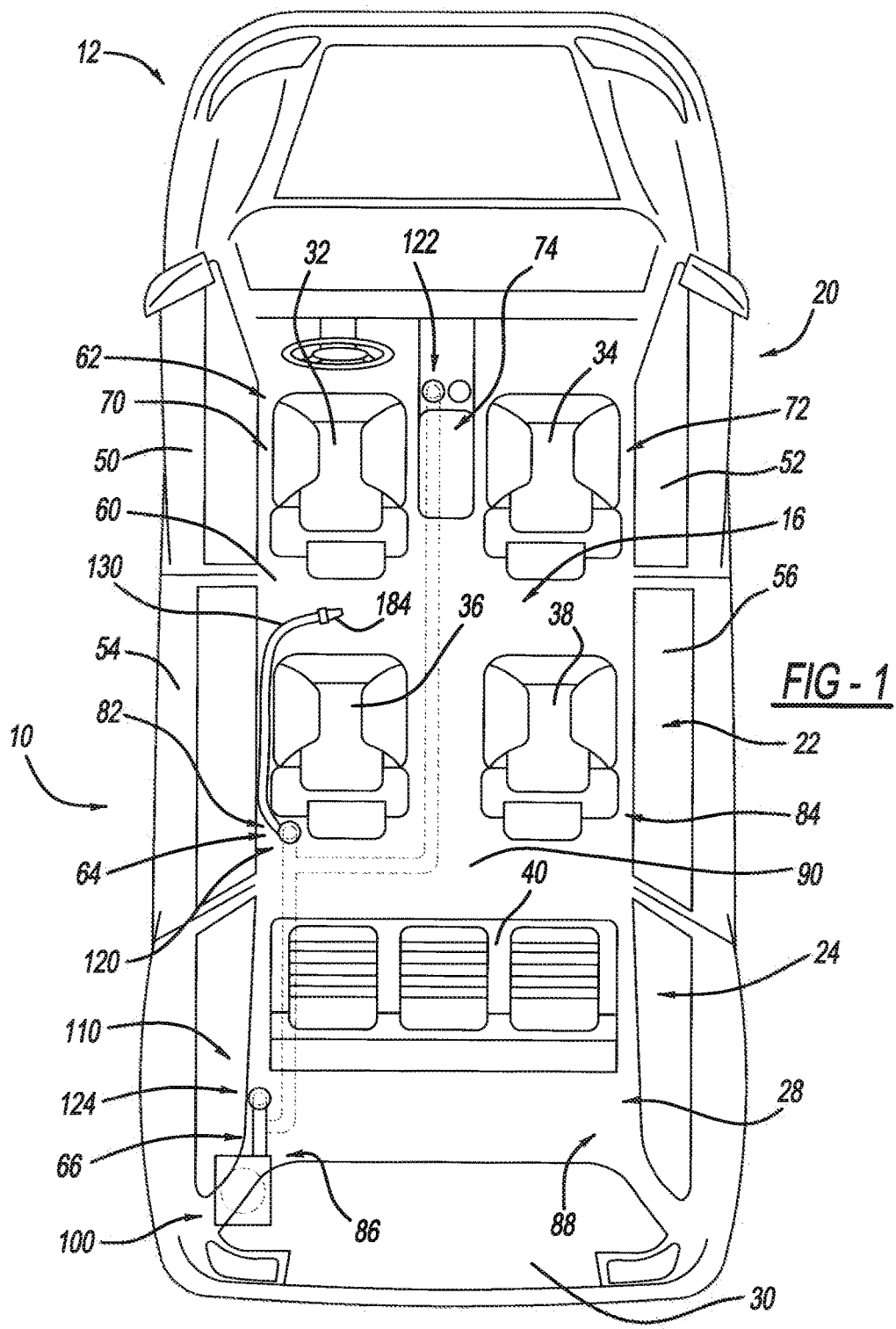
FIG. 1 is a top view of an exemplary vehicle incorporating an on-board central vacuum system according to one example of the present disclosure.

With initial reference to FIG. 1, an on-board central vacuum system constructed in accordance to one example of the present disclosure is shown and generally identified at reference numeral 10. The on-board central vacuum system 10 is configured for use in a vehicle 12 having an interior space 16 that includes a first row of seats 20, a second row of seats 22 and a third row of seats 24. The vehicle 12 further includes a rear cargo area 28 positioned generally between the third row of seats 24 and a rear door 30. In the example shown, the first row of seats 20 comprises a front driver seat 32 and a front passenger seat 34. The second row of seats 22 comprises a first captain chair 36 and a second captain chair 38. The third row of seats 24 comprises a rear bench 40.

Other configurations are contemplated. For example, the second row of seats 22 can include a bench similar to the rear bench 24. The particular vehicle layout shown is for a mini-van, sport utility or crossover vehicle. It will be appreciated however that the on-board central vacuum system 10 may be used in other vehicles having other configurations such as those having only two rows of seats.

Additional features of the vehicle 12 will now be described. The vehicle 12 includes a front driver side door 50, a front passenger side door 52, a second row driver side door 54 and a second row passenger side door 56. The vehicle 12 further includes interior trim collectively identified at reference 60. The interior trim 60 includes first row trim 62, second row trim 64 and third row trim 66. As used herein the term "trim" is used to denote any hard or soft surfaces within the interior of the vehicle 12. While not limited, the interior trim 60 used as part of the on-board central vacuum system 10 includes hard plastic surfaces that generally flow within the vehicle interior adjacent to the first, second and third rows of seats 20, 22 and 24.

The first row trim 62 includes first row driver side trim 70, first row passenger side trim 72 and a center console 74 generally positioned between the driver seat 32 and the passenger seat 34. The second row trim 64 includes second row driver side trim 82 and second row passenger side trim 84. The third row trim 66 includes third row driver side trim 86 and third row passenger side trim 88. The vehicle 12 further includes an interior floor 90 that extends throughout the vehicle 12 and generally defines a lower boundary of the interior space 16.

With continued reference to FIG. 1 and additional reference to FIGS. 2-5, the on-board central vacuum system 10 will now be further described. The on-board central vacuum system 10 includes a vacuum motor assembly 100, a series of vacuum port assemblies collectively referred to as reference 110, and a connecting hose 112. As will become appreciated herein, the on-board central vacuum system 10 provides a vacuum system integrated into the vehicle 12 that allows an operator ease of use and accessibility to all areas of the interior space 16. Specifically, the vacuum port assemblies 110 include a first vacuum port assembly 120, a second vacuum port assembly 122 and a third vacuum port assembly 124. Each of the vacuum port assemblies 120, 122 and 124 can be used to selectively couple a hose assembly 130 threat. In this regard, the hose assembly 130 may connected to the first vacuum port assembly 120 when it is desired to vacuum an area of the interior space 16 near the second row 22. Similarly, the hose assembly 130 may be connected to the second vacuum port assembly 122 when it is desired to vacuum an area of the interior space 16 near the first row of seats 20. The hose assembly 130 can also be connected to the third vacuum port assembly 124 when it is desired to vacuum an area of the interior space near the third row of seats 24 and/or in the rear cargo area 28.

Figure 4:
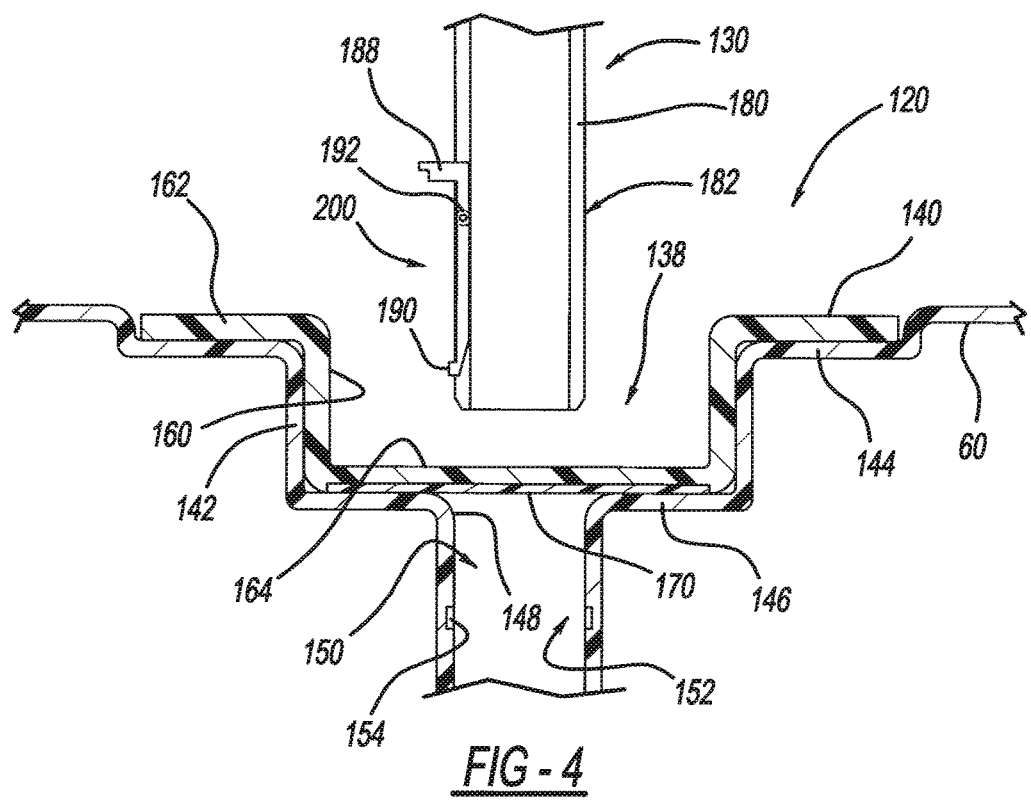
FIG. 4 is a cross-sectional view of a vacuum port assembly of the on-board vacuum assembly of FIG. 1 and shown in a first configuration whereby a cup holder is received by vehicle trim at the vacuum port.

With particular reference now to FIG. 4, the first vacuum port assembly 120 will be described with the understanding that the second and third vacuum port assemblies 122 and 124 are similarly constructed. The first vacuum port assembly 120 includes a recess 138 and a cup holder 140. The recess 138 is formed in the interior trim 60. The recess 138 comprises an annular trim wall 142 that connects an upper rim 144 with a lower end surface 146. The recess 138 forms an entrance 148 that leads into a port 150 at the end surface 146. The first vacuum port assembly 120 further includes a first connection portion 152 at the port 150. The first connection portion 152 defines a notch 154. As will become appreciated, the first connection portion 152 serves as a quick-connect structure for the hose assembly 130.

Figure 5:
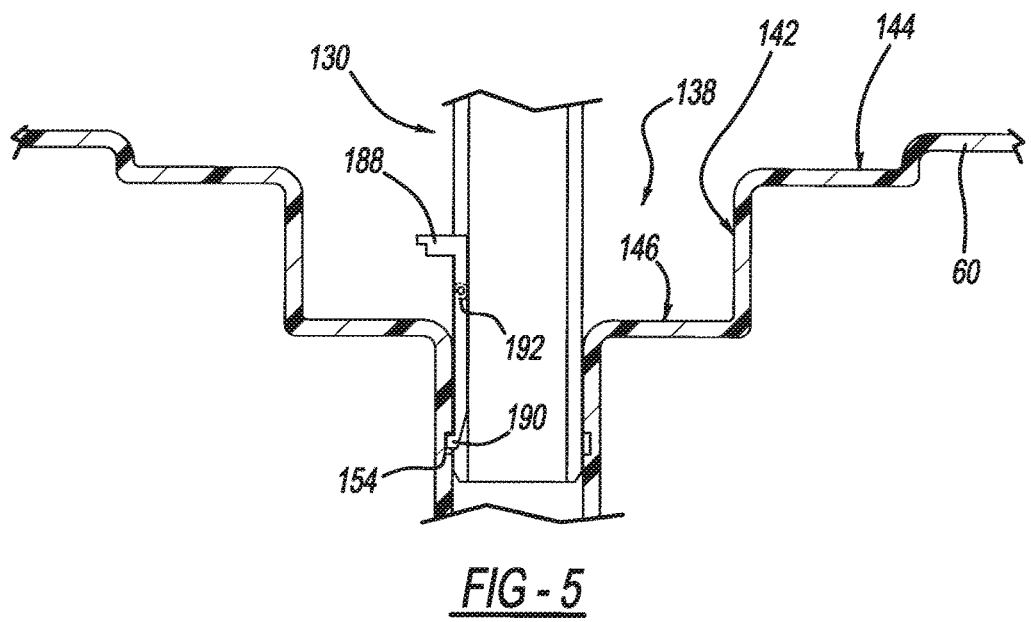
FIG. 5 is a cross-sectional view of the vacuum port assembly of FIG. 4 and shown in a second configuration whereby the cup holder is removed from the vehicle trim revealing access to the vacuum port.

The cup holder 140 includes a cup holder body 160 having a cup holder annular wall 160 that connects an upper flange 162 and a lower surface 164. The cup holder 140 is movable between an installed position (FIG. 4) and a removed position (FIG. 5). In the installed position, the cup holder 140 is received by the recess 138 and blocks access to the port 150. In the removed position the cup holder 140 is removed from the recess 138 revealing access to the port 150. In the installed position (FIG. 4), the upper flange 162 sits atop the upper wall 144 of the trim 60. The cup holder annular wall 160 is radially offset inwardly from the annular trim wall 142. The lower surface 164 rests atop the end surface 146. The lower surface 164 additionally includes a compliant seal 170 disposed thereon. The compliant seal 170 is positioned between the cup holder 140 and the port 150 in the installed position and fluidly seals the port 150 when the cup holder 140 is in the installed position.

With reference now to FIGS. 4 and 5 the hose assembly 130 will be further described. In general the hose assembly 130 includes a hose 180 that extends between a second connection portion 182 and a nozzle 184 (FIG. 1). The second connection portion 182 includes a user actuating portion 188, a finger 190 and a biasing member 192. The user actuating portion 188 is in the form of a quick-connect that moves between a coupled position (FIG. 5) with the first connection portion 152 and a de-coupled position (FIG. 4) from the first connection portion 152.

The biasing member 192 biases the user actuating portion 188 toward the coupled position. In the coupled position, the finger 190 nests into the notch 154 thereby securing the hose assembly 130 to the first connection portion 152 and ultimately to the vacuum port assembly 120. To move the second connection portion 182 to the de-coupled position, the user actuating portion 188 is advanced (in a generally downward or counter-clockwise direction as viewed in FIG. 4) against the bias of the biasing member 192 thereby removing the finger 190 from the notch 154. The first and second connection portions 152 and 182 collectively provide a quick connect assembly 200 that allows a user to quickly connect and disconnect the hose assembly 130 to any of the port assemblies 120, 122 and 124. It will be appreciated that the mechanical configuration shown in FIGS. 4 and 5 may take several forms. In one example the second connection portion 182 can include an annular collar that moves toward and away from the first connection portion 152.

According to additional features of the present disclosure, the vacuum motor assembly 100 is operable in a first vacuum mode of operation and a second blower mode of operation. In the first vacuum mode of operation air is directed from the vacuum port assemblies 110 toward the vacuum motor assembly 100. In the second blower mode of operation air is directed from the vacuum motor assembly 100 toward the vacuum port assemblies 110.

Figure 2:
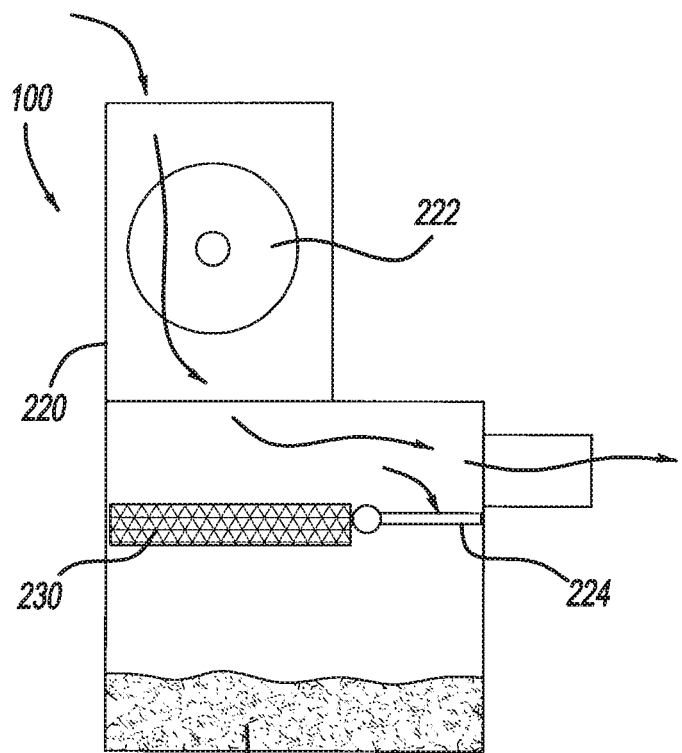
FIG. 2 is a side view of a vacuum motor assembly of the central vacuum system of FIG. 1 and shown in a blower configuration.
Figure 3:
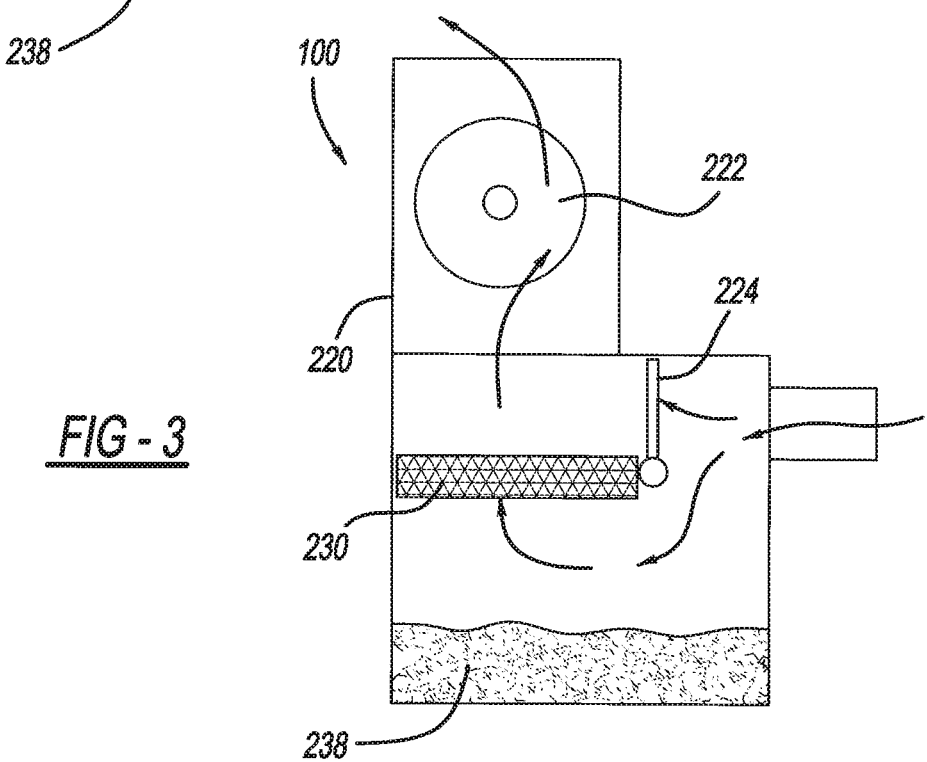
FIG. 3 is a side view of the vacuum motor assembly of FIG. 2 and shown in a vacuum configuration.

With reference now to FIGS. 2 and 3, additional features of the vacuum motor assembly 100 will be described. The vacuum motor assembly 100 generally includes a housing 220, a motor 222 disposed in the housing 220 and a check valve or flapper 224 disposed on the housing 220. The check valve 224 is movable between a vacuum position (FIG. 3) wherein air is directed toward the vacuum motor assembly 100 from the vacuum port assemblies 110 and a blower position (FIG. 2) wherein air is directed away from the vacuum motor assembly 100 toward the vacuum port assemblies 110. A filter 230 is positioned in the housing 220 for filtering air that has been vacuumed from the vehicle interior 16 through the vacuum port assemblies 110. While vacuuming, debris 238 can collect in the housing 220 for later removal by a user.

The check valve 224 automatically finds the correct position to allow the system to be a blower or a vacuum depending on which direction the motor 222 causes the air to flow. When the motor 222 creates positive pressure as a blower, it will push the check valve 224 down into the position shown in FIG. 2. The air flowing past the filter 230 will always be a lower pressure for a short transient time which serves to speed the process. When the motor 222 becomes a vacuum, the lower pressure at the motor and relatively high pressure in the debris storage area (due again to the filter pressure drop) will force the check valve 224 into the position shown in FIG. 3.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. An on-board central vacuum system for a vehicle, the on-board central vacuum system comprising:
   a vacuum motor assembly;
   a first vacuum port assembly configured in a first location of the vehicle, the first vacuum port assembly comprising:
      a recess formed in vehicle trim, the recess forming an entrance that leads into a first port having a first connection portion; and
      a cup holder removably positioned in the recess, the cup holder comprising a cavity with a bottom surface, the cavity sized to accommodate a cup when positioned therein, the cup holder movable between (i) an installed position wherein the cup holder is received by the recess and blocks access to the first port and (ii) a removed position wherein the cup holder is removed from the recess revealing access to the first port;
   a hose assembly that selectively mates with the vacuum port assembly in a coupled position when the cup holder is in the removed position, the hose assembly having a hose that extends into the recess, the hose having a second connection portion that selectively engages the first connection portion; and
   a connecting hose that fluidly connects the vacuum motor assembly to the first port.

2. The on-board central vacuum system of claim 1 wherein the recess formed in the vehicle trim further comprises an annular trim wall that connects an upper rim and a lower end surface, and wherein the first port defines a first entrance through the lower end surface, wherein the hose extends through a plane defined by the lower end surface in the coupled position.

3. The on-board central vacuum system of claim 1, further comprising a compliant seal positioned between the first port and the cup holder in the installed position.

4. The on-board central vacuum system of claim 2 wherein the upper rim and the lower end surface are parallel to each other.

5. The on-board central vacuum system of claim 1 wherein the second connection portion comprises a quick-connect having a user actuating portion that moves between a coupled position and a de-coupled position.

6. The on-board central vacuum system of claim 5 wherein the user actuating portion is biased toward the coupled position.

7. The on-board central vacuum system of claim 1, further comprising a second vacuum port assembly configured in a second location of the vehicle, wherein the first and second locations are distinct.

8. The on-board central vacuum system of claim 7 wherein the first vacuum port assembly is located in vehicle trim adjacent to a second row of seats.

9. The on-board central vacuum system of claim 8 wherein the second vacuum port assembly is located in one of a center console and a rear cargo area of the vehicle.

10. The on-board central vacuum system of claim 1 wherein the vacuum motor assembly is operable in a first vacuum mode of operation where air is directed from the first vacuum port assembly toward the vacuum motor assembly and in a second blower mode of operation where air is directed from the vacuum motor assembly toward the first vacuum port assembly.

11. The on-board central vacuum system of claim 10 wherein the vacuum motor assembly further comprises:
   a housing;
   a motor disposed in the housing; and
   a valve disposed in the housing and movable between (i) a vacuum position wherein air is directed toward the vacuum motor assembly and (ii) a blower position wherein air is directed away from the vacuum motor assembly.

12. The on-board central vacuum system of claim 11 wherein the vacuum motor assembly further comprises a filter disposed in the housing.

* * * * *